(12) United States Patent
Chakrabarti et al.

(10) Patent No.: US 7,567,962 B2
(45) Date of Patent: Jul. 28, 2009

(54) GENERATING A LABELED HIERARCHY OF MUTUALLY DISJOINT CATEGORIES FROM A SET OF QUERY RESULTS

(75) Inventors: Kaushik Chakrabarti, Redmond, WA (US); Seung-won Hwang, Champaign, IL (US); Surajit Chaudhuri, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 413 days.

(21) Appl. No.: 10/917,791

(22) Filed: Aug. 13, 2004

(65) Prior Publication Data

US 2006/0036581 A1   Feb. 16, 2006

(51) Int. Cl.
  G06F 17/30 (2006.01)
(52) U.S. Cl. ......................................... 707/7
(58) Field of Classification Search ...................... 707/3
  See application file for complete search history.

(56) References Cited

U.S. PATENT DOCUMENTS

| | | | |
|---|---|---|---|
| 5,913,206 A | 6/1999 | Chaudhuri et al. | |
| 5,913,207 A | 6/1999 | Chaudhuri et al. | |
| 5,924,090 A * | 7/1999 | Krellenstein | 707/5 |
| 5,926,813 A | 7/1999 | Chaudhuri et al. | |
| 5,940,821 A * | 8/1999 | Wical | 707/3 |
| 5,950,186 A | 9/1999 | Chaudhuri et al. | |
| 5,960,423 A | 9/1999 | Chaudhuri et al. | |
| 6,169,983 B1 | 1/2001 | Chaudhuri et al. | |
| 6,182,066 B1 * | 1/2001 | Marques | 707/5 |
| 6,223,171 B1 | 4/2001 | Chaudhuri et al. | |
| 6,266,658 B1 | 7/2001 | Adya et al. | |
| 6,356,890 B1 | 3/2002 | Agrawal et al. | |
| 6,356,891 B1 | 3/2002 | Agrawal et al. | |
| 6,363,371 B1 | 3/2002 | Chaudhuri et al. | |
| 6,366,903 B1 | 4/2002 | Agrawal et al. | |
| 6,374,241 B1 * | 4/2002 | Lamburt et al. | 707/6 |
| 6,460,045 B1 | 10/2002 | Aboulnaga et al. | |
| 6,513,029 B1 | 1/2003 | Agrawal et al. | |
| 6,529,901 B1 | 3/2003 | Chaudhuri et al. | |
| 2002/0087550 A1 * | 7/2002 | Carlyle et al. | 707/10 |
| 2002/0099700 A1 * | 7/2002 | Li | 707/5 |
| 2002/0103787 A1 * | 8/2002 | Goel et al. | 707/3 |
| 2003/0022200 A1 | 1/2003 | Vissing et al. | |
| 2003/0154204 A1 | 8/2003 | Chen-Wright et al. | |
| 2003/0182276 A1 | 9/2003 | Bossman et al. | |
| 2004/0003005 A1 | 1/2004 | Chaudhuri et al. | |
| 2004/0019593 A1 | 1/2004 | Borthwick et al. | |
| 2004/0128282 A1 * | 7/2004 | Kleinberger et al. | 707/3 |
| 2004/0139061 A1 * | 7/2004 | Colossi et al. | 707/3 |

(Continued)

OTHER PUBLICATIONS

Ananthakrishna, et al., "Eliminating Fuzzy Duplicates in Data Waehouses," Proceedings of the 28th VLDB Conference on Very Large Databases, 2002, pp. 12.

(Continued)

*Primary Examiner*—Tim T. Vo
*Assistant Examiner*—Aaron Sanders
(74) *Attorney, Agent, or Firm*—Lee & Hayes, PLLC (57) ABSTRACT

At least one implementation of database management technology, described herein, utilizes categorization of query results when querying a relational database in order to reduce information overload. To reduce information overload even further, another implementation, described herein, utilizes both categorization and ranking of query results when searching a relational database.

16 Claims, 3 Drawing Sheets

U.S. PATENT DOCUMENTS

| | | |
|---|---|---|
| 2005/0027717 A1 | 2/2005 | Koudas et al. |
| 2005/0086263 A1 | 4/2005 | Ngai et al. |
| 2005/0125401 A1 | 6/2005 | Carr et al. |
| 2005/0149907 A1 | 7/2005 | Seitz et al. |
| 2005/0192978 A1 | 9/2005 | Lightstone et al. |

OTHER PUBLICATIONS

Aref, et al., "Hashing by Proximity to Process Duplicates in Spatial Databases", Proceedings of Conference on Information and Knowledge Managements, Nov. 28-Dec. 2, 1994, pp. 347-354.

Berndt, et al., "Customer and Household Matching: Resolving Entity Identity in Data Warehouses", Proceedings of the SPIE, vol. 4057, 2000, pp. 173-180.

Bitton, et al., "Duplicate Record Elimination in Large Data Files", ACM Transactions on Database Systems, vol. 8, No. 2, Jun. 1983, pp. 255-265.

Chaudhuri, et al., "Robust and Efficient Fuzzy Match for Online Data Cleaning," Proceedings of the ACM SIGMOD, Jun. 2003, pp. 313-324.

Cohen, "Integration of Heterogeneous Databases Without Common Domains Using Queries Based on Textual Similarity," Proceedings of ACM SIGMOD, Jun. 1998, Seattle, WA, pp. 201-212.

Cohen, et al., "Learning to Match and Cluster Large High-Dimensional Data Sets for Data Integration", Proceedings of the ACM SIGKDD International Conference on Knowledge Discovery and Data Mining, 2002, pp. 475-480.

Elfeky et al., "Institute of Electrical and Electronics Engineers: Tailor: a record linkage toolbox", Proceedings of the 18th International Conference on Data Engineering. (ICDE '2002). San Jose, CA. Feb. 26-Mar. 1, 2002, pp. 17-28.

Ester, et al., " A density-based algorithm for discovering clusters in large spatial databased with noise", Second International Conference on Knowledge Discovery and Data Mining AAAI Press Menlo Park, CA, US, 1996 pp. 226-331.

Gu, et al., "Record Linkage: Current Practice and Future Directions", CSIRO Mathematical and Information Sciences-Technical Report, 03/83, Apr. 2003, pp. 1-32.

Hernandez, et al., "Real-world Data is Dirty: Data Cleansing and The Merge/Pruge Problem", Data Mining and Knowledge Discovery, vol. 2, No. 1, 1998, pp. 9-37.

Hernandez, et al, "The Merge/Purge Problem for Large Databases," Proceedings of the ACM SIGMOD, May 1995, San Jose, CA, pp. 127-138.

Khizder, et al., "Reasoning about Duplicate Elimination with Description Logic", Computational Logic-CL 200D, vol. 1861, Jul. 24-28, 2000, pp. 1017-1032.

Low, et al., "A Knowledge-based Approach for Duplicate Elimination in Data Cleaning", Information Systems, vol. 26, No. 8, Dec. 2001, pp. 585-606.

Mathkour, et al., "An Intelligent Tool for Boosting Database Performance", Journal of King Saud University (Computer and Information Sciences). vol. 10. 1998. pp. 81-106.

Monge, et al., "An efficient domain-independent algorithm for detecting approximately duplicate database records," Proceedings of the ACM SIGMOD Workshop—Data Mining and Knowledge Discovery, May 1997, pp. 23-29.

Monge, et al., "The Field Matching Problem: Algorithms and Applications," Proceedings / Second Int'l. Conference on Knowledge Discovery & Data Mining. 1996, pp. 267-270.

Qiao, et al., "RHist: Adaptive Summarization over Continuos Data Streams", Proceedings of the Eleventh Int'l. Conference on Information and Knowledge Management, 2002, pp. 469-478.

Saake, et al., "Sorting, Grouping, and Duplicate Elimination in the Advanced Information Management Prototype", Proceedings of the Fifteenth International Conference on Very Large Data Bases, 1989, pp. 307-316.

Schwartz, "Databases and Merge/Purge: Select the Proper Service", Computers in Biology and Medicine, vol. 48, No. 3, Jul. 1985, pp. 56, 58.

Slivinskas, et al., "A Foundation for Conventional and Temporal Query Optimization Addressing Duplicates and ordering", IEEE Transactions on Knowledge and Data Engineering. vol. 13, No. 1, Jan.-Feb. 2001, pp. 21-49.

Wajda, et al., "Simplifying Record Linkage: Sorftware and Strategy", Computers in Biology and Medicine, vol. 17., No. 4, 1987, pp. 239-248.

Shahri, et al., "Data Mining for Removing Fuzzy Duplicates Using Fuzzy Inference", retrieved on Feb. 6, 2009 at <<http://ieeexplorer.ieee.org/stamp/stamp.jsp?arnumber=1336319&isnumber=29474>>, Fuzzy Information 2004, Processing NAFIPS 2004, IEEE Annual Meeting of the North America, vol. 1, Jun. 27-30, 2004, pp. 419-424.

\* cited by examiner

Fig. 3

GENERATING A LABELED HIERARCHY OF MUTUALLY DISJOINT CATEGORIES FROM A SET OF QUERY RESULTS

TECHNICAL FIELD

This invention generally relates to technology for database queries and generation of results based upon such queries.

BACKGROUND

Those of ordinary skill in the art are familiar with the databases and the management thereof. However, Applicant will provide a brief introduction to specific terminology to provide a full foundation for the background.

According to the online Webopedia, a database is typically considered a collection of information organized in such a way that a computer program module can quickly select desired pieces of data.

To access information from a database, a database management system (DBMS) is used. Typically, a DBMS is a collection of program modules that facilitates storing, modifying, and extracting information from a database.

The most popular database model is the relational database model. Relational databases organize information using fields, records and tables. Unless the context indicates otherwise, references to a DBMS are references to a relational DBMS.

A DBMS is most suited for managing structured data (i.e., where each data item is a structured tuple consisting of a fixed set of fields, each field containing a single value or a set of values). On the other hand, information retrieval systems or search engines like GOOGLE™, VERITY™ etc. are more appropriate for managing text/unstructured data. Such systems can be used for searching individual text databases (e.g., VERITY™, ULTRASEEK™, GLIMPSE™/WEB-GLIMPSE™) as well as the internet (e.g., GOOGLE™).

Typically, requests for information from a database are made in the form of a query, which is a stylized question. Different DBMSs support different query languages (which are sets of rules for constructing queries). However, there is a semi-standardized query language called SQL (structured query language).

Information Overload

DBMS are being increasingly used for interactive and exploratory data retrieval. In such retrieval, queries often result in too many answers. Not all the retrieved items are relevant to the user; typically, only a tiny fraction of the result set is relevant to her.

Unfortunately, she often needs to examine all or most of the retrieved items to find those interesting ones. This too-many-answers phenomenon is commonly referred to as "information overload".

For example, consider a real-estate database that maintains information like the location, price, number of bedrooms etc. of each house available for sale. Suppose that a potential buyer is looking for homes in the Seattle/Bellevue area of Washington, USA in the $200,000 to $300,000 price range. That query returns 6,045 homes when executed on a public home listing database (e.g., MSN® HOUSE & HOME online database).

Information overload makes it hard for the user to separate the interesting items from the uninteresting ones, thereby leading to a huge waste of user's time and effort. Information overload can happen when the user is not certain of what she is looking for. In such a situation, she would pose a broad query in the beginning to avoid exclusion of potentially interesting results.

For example, a user shopping for a home is often not sure of the exact neighborhood she wants or the exact price range or the exact square footage at the beginning of the query. Such broad queries may also occur when the user is naïve and refrains from using advanced search features. Finally, information overload is inherent when users are interested in browsing through a set of items instead of searching among them.

Information Overload and Internet Text Query

In the context internet text search, there are two canonical ways to avoid information overload. First, internet text search engines group the search results into separate categories. Each category is assigned a descriptive label. Often results are manually categorized. By examining these labels, the user can determine whether the category is relevant or not; she can then click on (i.e., explore) just the relevant categories and ignore the remaining ones. Second, they present the answers to the queries in a ranked order.

Thus, categorization and ranking present two complementary techniques to manage information overload. After browsing the categorization hierarchy and/or examining the ranked results, users often reformulate the query into a more focused narrower query. Therefore, categorization and ranking are indirectly useful even for subsequent reformulation of the queries in the realm of internet text search.

SUMMARY

At least one implementation of database management technology, described herein, utilizes categorization of query results when querying a relational database in order to reduce information overload. To reduce information overload even further, another implementation, described herein, utilizes both categorization and ranking of query results when searching a relational database.

BRIEF DESCRIPTION OF THE DRAWINGS

The same numbers are used throughout the drawings to reference like elements and features.

DETAILED DESCRIPTION

The following description sets forth techniques that facilitate querying a relational database and generating results from such a query that utilize categorization and/or ranking. The techniques may be implemented in many ways, including (but not limited to) program modules, computing systems, dedicated electronics, and as part of computer networks.

An exemplary implementation of these techniques may be referred to as an "exemplary query-results categorizer" and is described below.

In the context internet text search, the results are typically grouped into separate categories and in ranked order. Thus, categorization and ranking present two complementary techniques to manage information overload in the realm of internet text search.

Information Overload and Relational Database Query

No conventional DBMS utilizes automatic categorization of query results when searching a relational database. Furthermore, no conventional DBMS utilizes both categorization and ranking of query results when searching a relational database.

At least one implementation of database management technology, described herein, utilizes categorization of query results when querying a relational database in order to reduce information overload. To reduce information overload even further, another implementation, described herein, utilizes both categorization and ranking of query results when searching a relational database.

Categorization of database query results presents some unique challenges that are not addressed in the approaches for Internet text search. Examples of such approaches are those used by internet search engines/web directories (e.g., YAHOO!™ and GOOGLE™) and on-line product catalog search (AMAZON™ and EBAY™).

In all the above conventional cases, the category structures are created a priori. The items are typically manually tagged (i.e., assigned categories) in advance. At search time, the search results are integrated with the pre-defined category structure by simply placing each search result under the category it was assigned during the tagging process.

Since such categorization is independent of the query, the distribution of items in the categories is susceptible to skew: some groups can have a very large number of items and some very few. For example, a search on 'databases' on AMAZON-.COM™ yields around 34,000 matches out of which 32,580 are under the "books" category.

These 32,580 items are not categorized any further. Typically, the category structure is created manually which deters the creation of a detailed category structure. That is why there are no subcategories under books. The user is forced to go through the long list to find the relevant items. Ultimately, this defeats the purpose of categorization as it retains the problem of information overload.

Exemplary Query-Results Categorizer

The exemplary query-results categorizer, described herein, automatically categorizes the results of queries (e.g., SQL queries) on a relational database in order to reduce information overload. Unlike the a priori categorization techniques described above, the exemplary query-results categorizer generates a labeled hierarchical category structure automatically based on the contents of the "tuples" in the answer set. Since this category structure is generated at query time and hence tailored to the answer set of the query at hand, it does not suffer from the problems of conventional a priori categorization discussed above.

In relational database systems, a "tuple" is a record, which is a complete set of information. Tuples are typically composed of fields, each of which contains one item of information. A set of tuples typically constitutes a table. For example, a personnel table might contain tuples that have three fields: a name field, an address field, and a phone number field.

Figure 1:
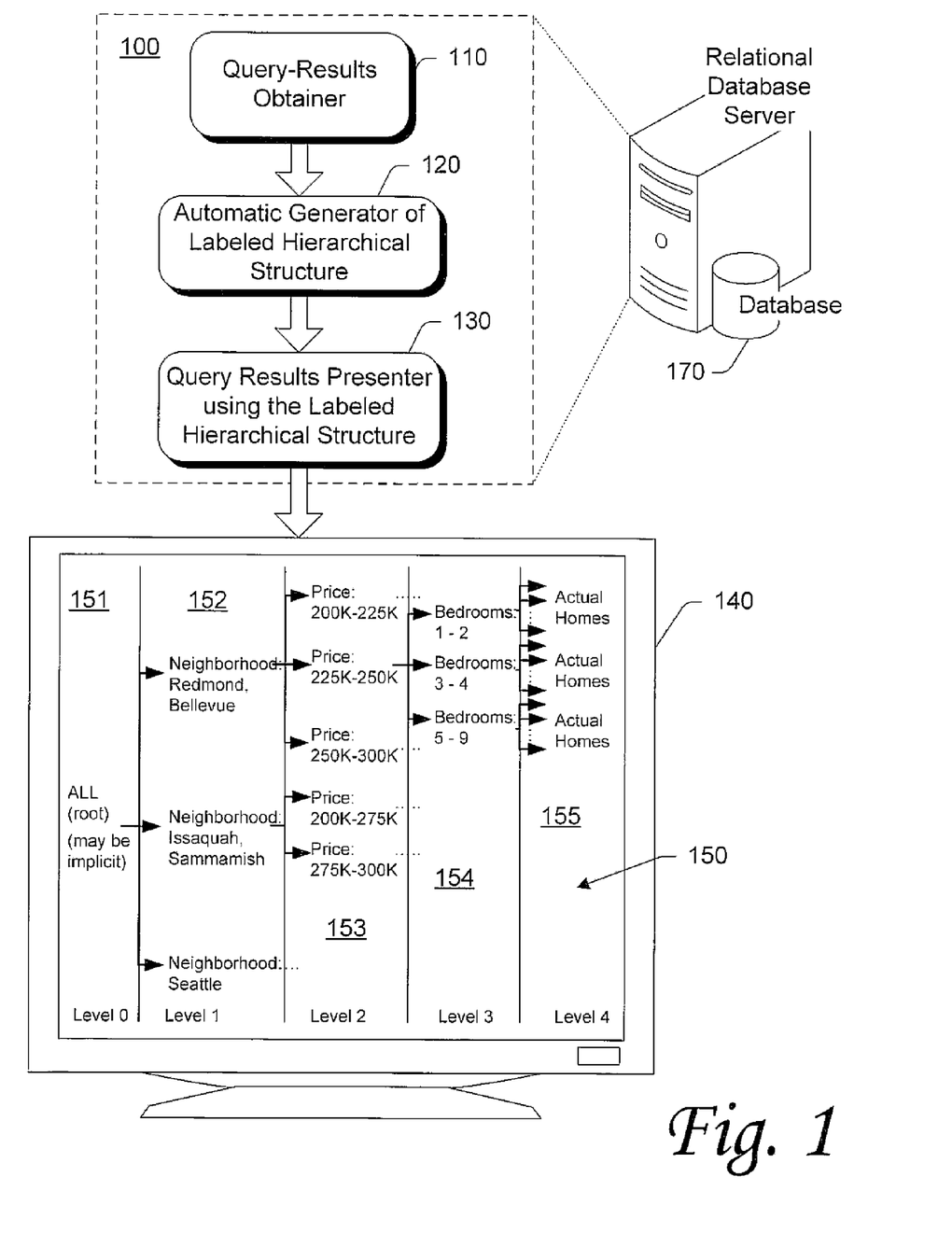
FIG. 1 is a block diagram of an implementation described herein.

FIG. 1 illustrates a Query-Results Categorizer Module (QRCM) 100. The exemplary query-results categorizer may be implemented by the QRCM 100, described herein. The components of the QRCM 100 may be implemented in software, hardware, or in a mixture of both.

The QRCM 100 may be implemented either as a client tool (separates from the server 160) or may be in-built inside the database server 160. This QRCM 100 may be implemented on a general purpose computer, a specific purpose computer, a portable computer, a personal digital assistant (PDA), an appliance, special purpose electronics, or other such computing and electronics equipment that are capable of managing a database.

The components of QRCM 100 are shown inside the dashed line in FIG. 1. The depicted system 100 includes a query-results obtainer 110, an automatic generator 120, and a query-results presenter 130. The system 100 is coupled (e.g., via a direction connection or via a network, such as the Internet) to a relational database server 160. On such server 160 is a relational database 170 which is the subject of the query and the source of the results of such query. The QRCM 100 and database 170 may reside in the same computing device (such as server 160) or across multiple devices.

With this QRCM 100, the obtainer 110 obtains results of a query. Examples of such obtaining include receiving a data packet with the query results therein, accessing a stored file containing such results, and/or submitting a query and receiving the results of that query. Such a query is typically submitted by a user who is searching the database 170.

The QRCM 100 may be incorporated with or be separate from the database query engine. Regardless, the obtainer 110 receives an answer set, which is the result of the query.

For example, consider a real-estate database that maintains information such as the location, price, number of bedrooms, etc. of each house available for sale. Suppose that a potential buyer is looking for homes in the Seattle/Bellevue area of Washington, USA in the $200,000 to $300,000 price range. (Herein, this query will be called the "Homes" query.) That query returns 6,045 homes when executed on a public home listing database.

The generator 120 receives these obtained query results (i.e., the answer set), and it automatically generates labeled hierarchical category structure based upon such results. The generator 120 defines the categories of the labeled hierarchical category structure based upon one or more attributes of the information content of a subset of tuples in the answer set.

In addition, the generator 120 optimizes the labeled hierarchical category structure so that branches of the labeled hierarchical category structure minimize information overload (on at least one level of the hierarchy).

The generator 120 may rank the nodes at one level, at least, of the labeled hierarchical category structure. This ranking may be based on many factors. One of those factors may be popularity of the attributes associated with a node. Such popularity may be based upon a history of queries on the database 170. Another factor may be cost of exploring the node which is highly correlated with the size of the node (number of ties contained in the node). In 1-level case, the coast is exactly the size.

The section below, titled "Implementation Details," provides additional details about how one or more implementations of the generator 120 accomplishes the automatically generated, labeled hierarchical category structure based upon such results.

The presenter 140 provides the answer set using the automatically generated, labeled hierarchical category structure. For example, display 150 illustrates an example of an answer set being presented on a monitor 140 using the automatically generated, labeled hierarchical category structure for that answer set. In particular, it presents the answer set to the exemplary "Homes" query discussed above.

In this exemplary answer set, presented in accordance with at least one aspect of the invention, there are multiple levels of the hierarchy. The base or root is level 151 in FIG. 1. The remainder (152-155) of the levels represents successive generations.

Using the presented results, the user may explore (i.e., browse) the labeled hierarchical category structure to quickly and easily find the information she seeks. Presentation, by the presenter 140, also includes transmitting or transferring for further processing.

Unlike other conventional approaches, the tuples of the answer set are not tagged for inclusion in one or more predefined categories when the tuples are provided for presentation, exploration, or additional processing.

Additional Implementation Details

This section provides additional details about how one or more implementations of the generator 120 accomplishes the automatic generation of labeled hierarchical category structure based upon such results.

Categorization

Let R be a set of tuples. R can either be a base relation or a materialized view (for browsing applications), or it can be the result of a query Q (for querying applications). For this example, it is assumed that that R does not contain any aggregated or derived attributes (i.e., Q does not contain any GROUP BYs or attribute derivations (Q is a SPJ query)).

A hierarchical categorization of R is a recursive partitioning of the tuples in R based on the data attributes and their values. To aid in this discussion, a valid hierarchical categorization T (also referred to as category tree) of R is defined inductively using the "base case," "inductive step," "category label," "tuple-set," and category attributes.

Base Case:

Given the root or "ALL" node (level 0 and illustrated as level 151 in FIG. 1) which contains all the tuples in R, the exemplary query-results categorizer partitions the tuples in R into an ordered list of mutually disjoint categories (or "nodes," which is used interchangeably with category herein) using a single attribute. That may be called level 1 and is shown as level 152 in FIG. 1.

For example, the root node 151 in display 150 of FIG. 1 is partitioned into 3 mutually disjoint categories using the "Neighborhood" attribute: "Neighborhood: Redmond, Bellevue" followed by "Neighborhood: Issaquah, Sammamish" followed by "Neighborhood: Seattle".

Inductive Step:

Given a node C at level (L-1) (where node C is any given node of a particular level and level (L-1) is any given subject level), the exemplary query-results categorizer partition the set of tuples tset(C) contained in C into an ordered list of mutually disjoint subcategories (level L nodes) using a single attribute which is the same for all nodes at level (L-1). The exemplary query-results categorizer partitions a node C only if C contains more than a designated or calculated number of tuples.

The attribute used is referred to as the categorizing attribute of the level L nodes and the subcategorizing attribute of the level L-1 nodes. For example, "Price" is the categorizing attribute of all nodes at level 153 (also the subcategorizing attribute of all nodes at level 152).

Furthermore, once an attribute is used as a categorizing attribute at any level, it is not repeated at a later level (i.e., there is a 1:1 association between each level of T and the corresponding categorizing attribute). The exemplary query-results categorizer imposes the above constraints to ensure that the categorization is simple, intuitive, and easily understandable to the user.

Associated with each node C is a category label and a tuple-set as defined below:

Category Label:

The predicate label(C) describing node C. For example, the first child of root (the category of level 152 rendered at the top of FIG. 1) has label 'Neighborhood~{Redmond, Bellevue}' (rendered as 'Neighborhood: Redmond, Bellevue' in FIG. 1) while the first child of the above category has label 'Price: 200K-225K'.

Tuple-Set:

The set of tuples tset(C) (called the tuple-set of C) contained in C; either appearing directly under C (if C is a leaf node) or under its subcategories (if C is a non-leaf node). Formally, tset(C) is the set of tuples, among the ones contained in the parent of C, which satisfy the predicate label(C). In other words, tset(C) is the subset of tuples in R that satisfies the conjunction of category labels of all nodes on the path from the root to C.

For example, in 150 of FIG. 1, tset(C) for the category with label 'Neighborhood: Redmond, Bellevue' is the set of all homes in R that are located either in Redmond or in Bellevue, while tset(C) for its child with label 'Price: 200K-225K' is the set of all homes in R that are located either in Redmond or in Bellevue and priced between 200K and 225K.

The label of a category, therefore, solely and unambiguously describes to the user which tuples, among those in the tuple set of the parent of C, appear under C. Hence, she can determine whether or not C contains any item that is relevant to herby looking just at the label and hence decide whether to explore or ignore C.

As discussed above, label(C) has the following structure:

If the categorizing attribute A is a categorical attribute: label(C) is of the form 'A∈B' where $B \subset \text{dom}_R(A)$ ($\text{dom}_R(A)$ denotes the domain of values of attribute A in R). A tuple t satisfies the predicate label(C) if t.A∈B; otherwise, it is false (t.A denotes the value of tuple t on attribute A).

If the categorizing attribute A is a numeric attribute: label(C) is of the form '$a_1 \leq A \leq a_2$' where $a_1, a_2 \subset \text{dom}_R(A)$. A tuple t satisfies the predicate label(C) is true if $a_1 \leq A \leq a_2$; otherwise it is false.

Described so far has been the structure of a hierarchical categorization which defines the class of permissible categorizations. To generate a particular instance of hierarchical categorization, the following is done for each level L:

Determine the categorizing attribute A for level L

Given the choice A of categorizing attribute for level L, for each category C in level (L-1), determine how to partition the domain of values of A in tset(C) into disjoint groups and how to order those groups.

The exemplary query-results categorizer chooses the attribute-partitioning combination at each level, such that the resulting instance $T_{opt}$ has the least possible information overload on the user. In other words, $T_{opt}$ is balanced.

For that purpose, the exemplary query-results categorizer utilizes a model that captures how a user navigates the result set R using a given category tree T.

Exploration Model

Implementations, described herein, use one of two models that capture two common scenarios in data exploration. One scenario is that the user explores the result set R using the category tree T until she finds every tuple t∈R relevant to her. In other words, she does not terminate the exploration after she has found some (but not all) relevant tuples. For example, the user may want to find every home relevant to her in the "Homes" query. In order to ensure that she finds every relevant tuple, she needs to examine every tuple and every category label except the ones that appear under categories she deliberately decides to ignore.

Another scenario is that the user is interested in just one (or a few) tuple(s) in R; so, she explores R using T till she finds that one (or few) tuple(s). For example, a user may be satisfied if she finds just one or two homes that are relevant to her. For the purpose of modeling, it is assumed that, in this scenario, the user is interested in just one tuple (i.e., the user explores the result set until she finds the first relevant tuple).

These two scenarios are considered because they both occur commonly and they differ in their analytical models. While other scenarios may be considered, for the implementations described herein, those other scenarios are not considered. That is because the above two represent the two ends of the spectrum of possible scenarios; other scenarios (e.g., user interested in two/few tuples) fall in between these two ends.

Exploration Model for 'All' Scenario.

The model of exploration of the subtree rooted at an arbitrary node C is shown in Table 1 below.

category, and non-deterministically chooses to either explore it or ignore it. If she chooses to ignore $C_i$, she simply proceeds and examines the next label (of $C_i+1$). If she chooses to explore $C_i$, she does so recursively, based on the same exploration model, i.e., by choosing either 'SHOWTUPLES' or 'SHOWCAT' if it is an internal node or by choosing 'SHOWTUPLES' if it is a leaf node. After she finishes the exploration of $C_i$, she goes ahead and examines the label of the next subcategory of C (of $C_i+1$). When the user reaches the end of the subcategory list, she is done. Note that, for this example, it is assumed that the user examines the subcategories in the order they appear under C; it can be from top to bottom or from left to right depending on how the tree is rendered by the user interface.

If C is a leaf node, 'SHOWTUPLES' is the only option (option 'SHOWCAT' is not possible since a leaf node has no subcategories).

Exploration Model for 'One' Scenario

The model of exploration of an arbitrary node C of the tree T is shown in Table 2 below.

TABLE 2

Explore C if C is non-leaf node,
    CHOOSE one of the following:
        (1) Examine tuples in tset(C) from beginning till $1^{st}$ relevant
            tuple found II Option SHOWTUPLES
        (2) for (i=1; i ≤n; i++) // Option SHOWCAT
            Examine the label of ith sub category $C_i$
            CHOOSE one of the following:
            (2.1) Explore $C_i$
            (2.2) Ignore $C_i$
            if (choice = Explore) break; // examine till $1^{st}$ relevant else // C is a leaf-node
    Examine all tuples in tset(C) from beginning till $1^{st}$ relevant tuple found // Option
SHOWTUPLES is the only option

TABLE 1

Explore C if C is non-leaf node,
    CHOOSE one of the following:
        (1) Examine all tuples in tset(C) // Option SHOWTUPLES
        (2) for (i=1; i ≤n; i++) // Option SHOWCAT
            Examine the label of $i^{th}$ subcategory $C_i$
            CHOOSE one of the following:
            (2.1) Explore $C_i$
            (2.2) Ignore $C_i$
else // C is a leaf-node
    Examine all tuples in tset(C) //SHOWTUPLES is only option The user starts the exploration by exploring the root node. Given that she has decided to explore the node C, if C is a non-leaf node, she non-deterministically (i.e., not known in advance) chooses one of the two options:

Option 'SHOWTUPLES': Browse through the tuples in tset(C). Note that the user needs to examine all tuples in tset(C) to make sure that she finds every tuple relevant to her.

Option 'SHOWCAT': Examine the labels of all the n subcategories of C, exploring the ones relevant to her and ignoring the rest. More specifically, she examines the label of each subcategory $C_i$, starting from the first sub- Once again, the user starts the exploration by exploring the root node. Given that the user has decided to explore a node C, she non-deterministically chooses one of the two options:

Option 'SHOWTUPLES': Browse through the tuples in tset(C) starting from the first tuple in tset(C) till she finds the first relevant tuple.

Option 'SHOWCAT': Examine the labels of the subcategories of C starting from the first subcategory till the first one she finds interesting. As in the 'ALL' scenario, she examines the label of each subcategory $C_i$ starting from the first one and non-deterministically chooses to either explore it or ignore it. If she chooses to ignore $C_i$, she simply proceeds and examines the next label. If she chooses to explore $C_i$, she does so recursively based on the same exploration model. For this example, it is assumed that when she drills down into $C_i$, she finds at least one relevant tuple in tset($C_i$); so, unlike in the 'ALL' scenario, the user does not need to examine the labels of the remaining subcategories of C.

If C is a leaf node, 'SHOWTUPLES' is the only option (browse through the tuples in tset(C) starting from the first one till she finds the first relevant tuple).

Cost Estimation

It is desirable for the labeled hierarchical category structure (or "tree" for short) to impose the least possible information overload on the user. To do that, the exemplary query-results categorizer estimates the information overload that a user will face during an exploration using a given category T. Each exploration scenario discussed above has its own cost model.

Cost Model for 'ALL' Scenario.

Given a user exploration X using category tree T, information overload cost, or simply cost (denoted by $Cost_{All}(X,T)$), is defined as the total number of items (which includes both category labels and data tuples) examined by the user during X.

The above definition is based on the assumption that the time spent in finding the relevant tuples is proportional to the number of items the user needs to examine: the more items she needs to examine, the more time wasted in finding the relevant tuples, the greater the information overload.

If one knew the mind of the user, one could deterministically know what choices a particular user will make. In other words, one would know which categories she will explore and which ones she will ignore, when she will use SHOWTUPLES and when SHOWCAT, etc. Therefore, one could generate the tree that would minimize the number of items this particular user needs to examine.

Since there is no user-specific knowledge, the exemplary query-results categorizer uses the aggregate knowledge of previous user behavior in order to estimate the information overload cost $Cost_{All}(T)$ that a user will face, on average, during an exploration using a given category tree T.

Based on the definition of information overload, $Cost_{All}(T)$ is the number of items (which includes category labels and data tuples) that a user will need to examine, on average, during the exploration of R using T till she finds all tuples relevant to her. Subsequently, one can find the category tree that minimizes this average cost of exploration.

Since the user choices are non-deterministic and not equally likely, the exemplary query-results categorizer knows the following two probabilities associated with each category of T in order to compute $Cost_{All}(T)$:

Exploration Probability: The probability P(C) that the user exploring T explores category C, using either SHOWTUPLES or SHOWCAT, upon examining its label. The probability that the user ignores C upon examining its label is therefore (1-P(C)).

SHOWTUPLES Probability: The probability $P_w(C)$ that the user chooses option 'SHOWTUPLES' for category C, given that she explores C. The SHOWCAT probability of C, i.e., the probability that the user chooses option 'SHOWCAT,' given that she explores C, is therefore (1-$P_w(C)$). If C is a leaf category, $P_w(C)=1$ because, given that the user explores C, 'SHOWTUPLES' is the only option.

Knowing these above probabilities, $Cost_{All}(T)$ is computed:

Consider a non-leaf node C of T. Let $C_1, C_2, \ldots, C_n$ be the n subcategories of C. Consider the cost $Cost_{All}(T_C)$ of exploring the subtree $T_C$ rooted at C, given that the user has chosen to explore C. Since the cost is always computed in the context of a given tree T, for simplicity of notation, $Cost_{All}(T_C)$ is denoted by $Cost_{All}(C)$ and $Cost_{All}(T)$ is denoted by $Cost_{All}(root)$. If the user goes for option 'SHOWTUPLES' for C, she examines all the tuples in tset(C), so the cost is |tset(C)|. If she chooses option 'SHOWCAT,' the total cost is the cost of examining the labels of all the subcategories plus the cost of exploring the subcategories she chooses to explore upon examining the labels. The first component is K*n where K is the cost of examining a category label relative to the cost of examining a data tuple; the second cost is $Cost_{All}(C_i)$ if she chooses to explore $C_i$, 0 if she chooses to ignore it.

Putting it all together, $$Cost_{All}(C) = P_w(C)*|tset(C)| + (1 - P_w(C)) * \left( K*n + \sum_{i=1}^{n} P(C_i) * Cost_{All}(C_i) \right) \quad (1)$$

If C is a leaf node, $Cost_{All}(C)=|tset(C)|$. Note that the above definition still holds as $P_w(C)=1$ for a leaf node.

Cost Model for 'ONE' Scenario:

In this scenario, the information overload cost $Cost_{One}(T)$ that a user will face, on average, during an exploration, using a given category tree T, is the number of items that a user will need to examine, on average, till she finds the first tuple relevant to her.

Consider the cost $Cost_{One}(C)$ of exploring the subtree rooted at C, given that the user has chosen to explore C; $Cost_{One}(T)$ is simply $Cost_{One}(root)$. If the user chooses option 'SHOWTUPLES' for C and frac(C) denotes the fraction of tuples in tset(C) that she needs to examine, on average, before she finds the first relevant tuple, the cost, on average, is frac(C)*|tset(C)|. If chooses option 'SHOWCAT,' the total cost is $(K*i+Cost_{One}(C_i))$ if $C_i$ is the first subcategory of C explored by the user (since the user examines only i labels and explores only $C_i$).

Putting it all together, $$Cost_{One}(C) = P_w(C) * frac(C) * |tset(C)| + (1 - P_w(C)) * \quad (2)$$
$$\sum_{i=1}^{n} Prob \text{ that } C_i \text{ is the first category explored} * (K*i + Cost_{One}(C_i))$$

The probability (218) that $C_i$ is the first category explored (i.e., probability that the user explores $C_i$ but none of $C_1$ to $C_{(i-1)}$) is $$\prod_{j=1}^{(i-1)} (1 - P(C_j)) * P(C_i), \text{ so} \quad (3)$$

$$Cost_{One}(C) = P_w(C) * frac(C) * |tset(C)| + (1 - P_w(C)) *$$
$$\sum_{i=1}^{n} \left( \prod_{j=1}^{(i-1)} (1 - P(C_j)) * P(C_i) * (K*i + Cost_{One}(C_i)) \right)$$

If C is a leaf node, $Cost_{One}(T_C)=frac(C)*|tset(C)|$; so the above definition still holds as $P_w(C)=1$ for a leaf node.

Using Workload to Estimate Probabilities.

As stated above, the exemplary query-results categorizer should know the probabilities $P_w(C)$ and $P(C)$ to be able to compute the average exploration cost $Cost_{All}(T)$ (or $Cost_{One}(T)$) of a given tree T.

To estimate these probabilities automatically, the exemplary query-results categorizer uses the aggregate knowledge of previous user behavior. Specifically, we look at the log of queries that users of this particular application have asked in the past (referred to as 'workload').

For example, this technique may utilize the log of SQL query strings as input for the aggregate knowledge. This log is easy to obtain since the profiling tools that exist on commercial DBMSs log the queries that are executed on the system anyway. Since the aggregate knowledge is used, the categorization is the same for all users for the same result set; it only varies with the result set.

Computing SHOWTUPLES Probability: Given that the user explores a non-leaf node C, she has two mutually exclusive choices: do SHOWTUPLES or do SHOWCAT.

Consider first the SHOWCAT probability of C (i.e., the probability that the user does SHOWCAT given that she explores C). It is presumed here that the user does SHOWCAT for C (given that she explores C) if the subcategorizing attribute SA(C) of C is such that user is interested in only a few of the subcategories (i.e., in only a few values of SA(C)); in this situation, using SHOWCAT enables her to ignore a large fraction of the subcategories and, hence, significantly cut down the number of tuples she needs to examine. On the other hand, if she is interested in all or most of the subcategories of C (i.e., in all or most values of SA(C), she will choose SHOWTUPLES).

The SHOWCAT probability of C is estimated using the workload as follows: Suppose that the workload query $W_i$ represents the information need of a user $U_i$. If $U_i$ has specified a selection condition on SA(C) in $W_i$, it typically means that she is interested in a few values of SA(C). On the other hand, absence of a selection condition on SA(C) means that she is interested in all values of SA(C). If $N_{Attr}(A)$ denotes the number of queries in the workload that contain a selection condition on attribute A, and N is the total number of queries in the workload, $N_{Attr}(SA(C))/N$ is the fraction of users who are interested in a few values of SA(C).

Assuming that the workload represents the activity of a large number of diverse users and hence forms a good statistical basis for inferencing user behavior, and the probability that a random user is interested in a few values of SA(C), (i.e., the SHOWCAT probability of C) is $N_{Attr}(SA(C))/N$). The SHOWTUPLES probability $P_w(C)$ of C (probability that the user chooses option 'SHOWTUPLES' for C, given that she explores C) is therefore $1-N_{Attr}(SA(C))/N$.

Computing Exploration Probability:

This involves the estimation of the probability P(C) that the user explores category C, either using SHOWTUPLES or SHOWCAT, upon examining its label. By definition, P(C)=P (User explores C|User examines label of C). Since user explores C implies that user has examined label of C, P(C)=P (User explores C)/P(User examines label of C). Since user examines label if she explores the parent (say C') of C and chooses SHOWCAT for C', $$P(C) = \frac{P(\text{User explores } C)}{P(\text{User explores } C' \text{and chooses } SHOWCAT \text{ for } C')}$$

$$= \frac{P(\text{User explores } C)}{P(\text{User explores } C') *}$$

$$P(\text{User chooses } SHOWCAT \text{ for } C' \mid \text{User explores } C')$$

P(user chooses SHOWCAT for C'|User explores C') is the SHOWCAT probability of $C'=N_{Attr}(SA(C))/N$.

A user explores C if, upon examining the label of C, she thinks that there may be one or more tuples in tset(C) that are of interest to her. In other words, the full path predicate of C (the conjunction of category labels of all nodes on the path from the root to C) is of interest to her. Assuming that the user's interest in a label predicate on one attribute is independent of her interest in a label predicate on another attribute, P(User explores C)/P(User explores C') is simply the probability that the user is interested in the label predicate label (C).

$$P(C) = \frac{P(\text{User interested in predicate label } (C))}{N_{Attr}(SA(C))/N}$$

Again, suppose that the workload query $W_i$ in the workload represents the information need of a user $U_i$. If $W_i$ has a selection condition on the categorizing attribute CA(C) of C, and that selection condition on CA(C) overlaps with the predicate label(C), it means that $U_i$ is interested in the predicate label(C). If $N_{Overlap}(C)$ denotes the number of queries in the workload whose selection condition on CA(C) overlaps with label(C), P(User interested in predicate label(C))= $N_{Overlap}(C)/N$. So, $P(C)=N_{Overlap}(C)/N_{Attr}(SA(C'))$. Since the subcategorizing attribute SA(C') of C' is, by definition, the categorizing attribute CA(C) of C, $P(C)=N_{Overlap}(C)/NAttr(CA(C))$.

As used herein, the term overlap is explained thusly: if CA(C) (say A) is a categorical attribute, the selection condition "A IN $\{v_1, \ldots, v_k\}$" on CA(C) in $W_i$ overlaps with the predicate label(C)='A∈B' if the two sets $\{v_1, \ldots, v_k\}$ and B are not mutually disjoint; if CA(C) (again say A) is a numeric attribute, the selection condition "$v_{min} \leq A \leq v_{max}$" on CA(C) in $W_i$ overlaps with the predicate label(C)='$a_1 \leq A \leq a_2$' if the two ranges $[v_{min}, v_{max}]$ and $[a_1, a_2]$ overlap.

Methodological Implementation

Figure 2:
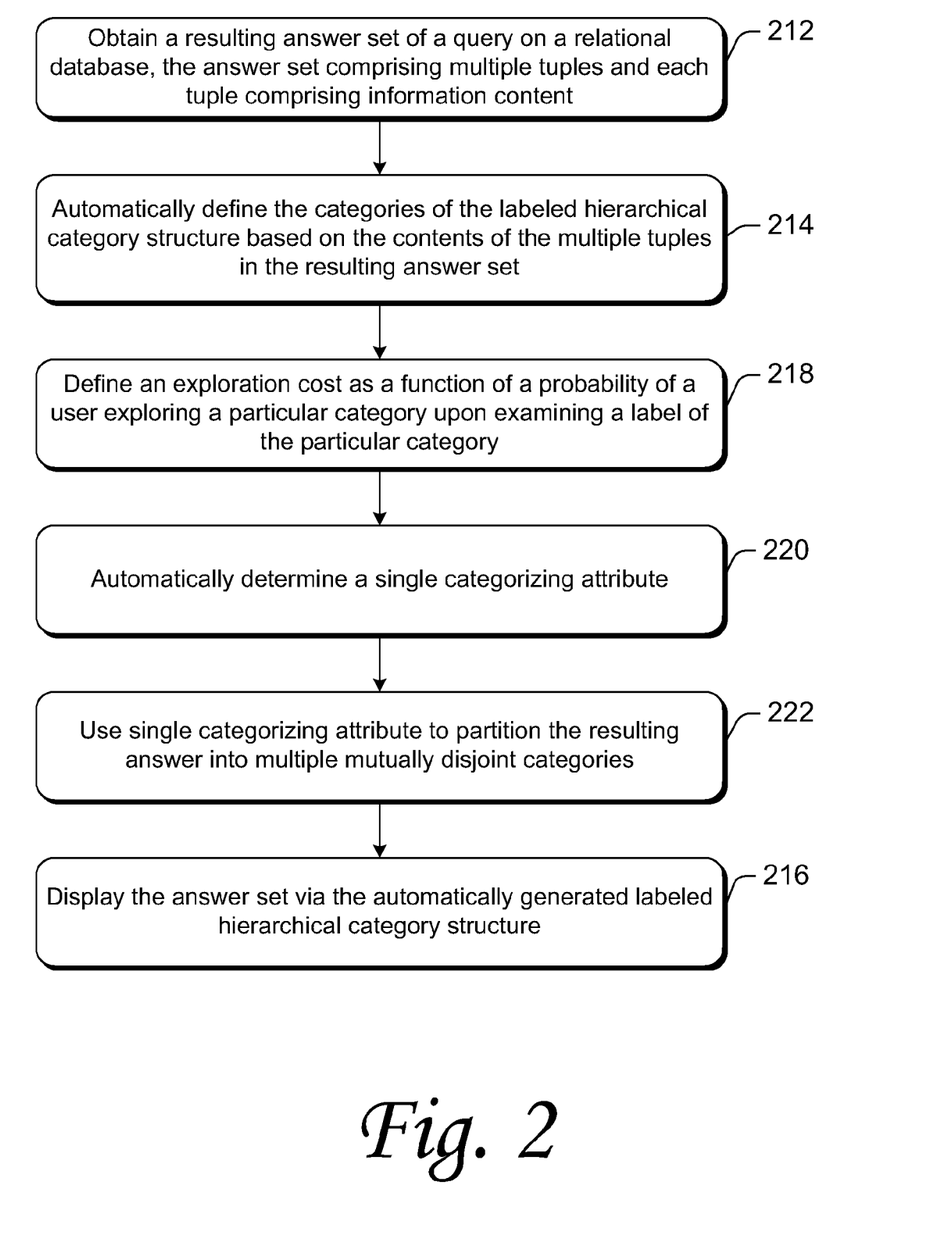
FIG. 2 is a flow diagram showing a methodological implementation described herein.

FIG. 2 shows a methodological implementation of the QRCM 100. This methodological implementation may be performed in software, hardware, or a combination thereof. For ease of understanding, the method steps are delineated as separate steps; however, these separately delineated steps should not be construed as necessarily order dependent in their performance.

This methodological implementation responds to a query of a relational database (such as database 170). Such a query is typically performed by a user requesting information from the database.

At 212 of FIG. 2, the QRCM 100 obtains a resulting answer set of the query on the relational database. This answer set includes tuples and probably a significantly large number of such tuples. These tuples contain information content, such as: a name field, an address field, and a phone number field.

At 214, the QRCM 100 automatically generates a labeled hierarchical category structure based on the contents of the multiple tuples in the answer set. Since the generation is based, at least in part, upon the resulting answer set, the labeled hierarchical category structure is generated after the obtaining of block 212.

The generation of block 214 includes defining the categories of the labeled hierarchical category structure based upon one or more attributes of the information content of a subset of tuples in the answer set.

Furthermore, the generation of block 214 also includes optimizing the labeled hierarchical category structure so that branches of the labeled hierarchical category minimizes information overload.

Furthermore, the generation of block 214 also includes ranking nodes at, one level, at least, of the labeled hierarchical category structure.

At 216, the QRCM 100 provides the answer set via the automatically generated, labeled hierarchical category structure. For example, display 150 illustrates an example of an answer set being presented on monitor 140 using the automatically generated, labeled hierarchical category structure for that answer set.

At this point, the user may explore (i.e., browse) the structure to quickly and easily find the information she seeks.

Unlike other conventional approaches, the tuples of the answer set are not tagged for inclusion in one or more pre-defined categories when the tuples are provided for presentation, exploration, or additional processing.

Distinction from Some Conventional Approaches

OLAP and Data Visualization:

Online Analytical Processing (OLAP) is a category of software tools that provides analysis of data stored in a database. Both an implementation of the exemplary query-results categorizer and OLAP include presenting a hierarchical, aggregated view of data to the user and allowing her to drill-down/roll-up the categories.

However, in OLAP, the user (e.g., data analyst) needs to manually specify the grouping attributes and grouping functions (for the computed categories). With the exemplary query-results categorizer, grouping attributes and grouping functions are determined automatically. Information visualization deals with visual ways to present information. It can be thought of as a step after categorization to further reduce information overload: given the category structure described herein, the exemplary query-results categorizer may use visualization techniques (using shape, color, size and arrangements) to visually display the tree.

Data Mining:

Data mining is a class of database applications that looks for hidden patterns in a group of data that can be used to predict future behavior. They often utilize clustering and classification.

With data mining, the space in which the clusters are discovered is usually provided there. However, in categorization, the exemplary query-results categorizer finds that space (e.g., the categorizing attributes).

With data mining, existing clustering algorithms deal with either exclusively categorical or exclusively numeric spaces. However, in categorization of the exemplary query-results categorizer, the space usually involves both categorical and numeric attributes.

With data mining, it utilizes an optimization criterion that minimizes inter-cluster distance in clustering. With the exemplary query-results categorizer, it is minimizing cost (e.g., information overload).

With data mining, it utilizes classification where the categories are already given there along with a training database of labeled tuples. The exemplary query-results categorizer predicts the label of future, unlabeled tuples.

Discretization/Histograms: The discretization work assumes that there is a class assigned to each numeric value (as in classification) and uses the entropy minimization heuristic. On the other hand, the histogram bucket selection is based on minimization of errors in result size estimation.

Exemplary Computing System and Environment

Figure 3:
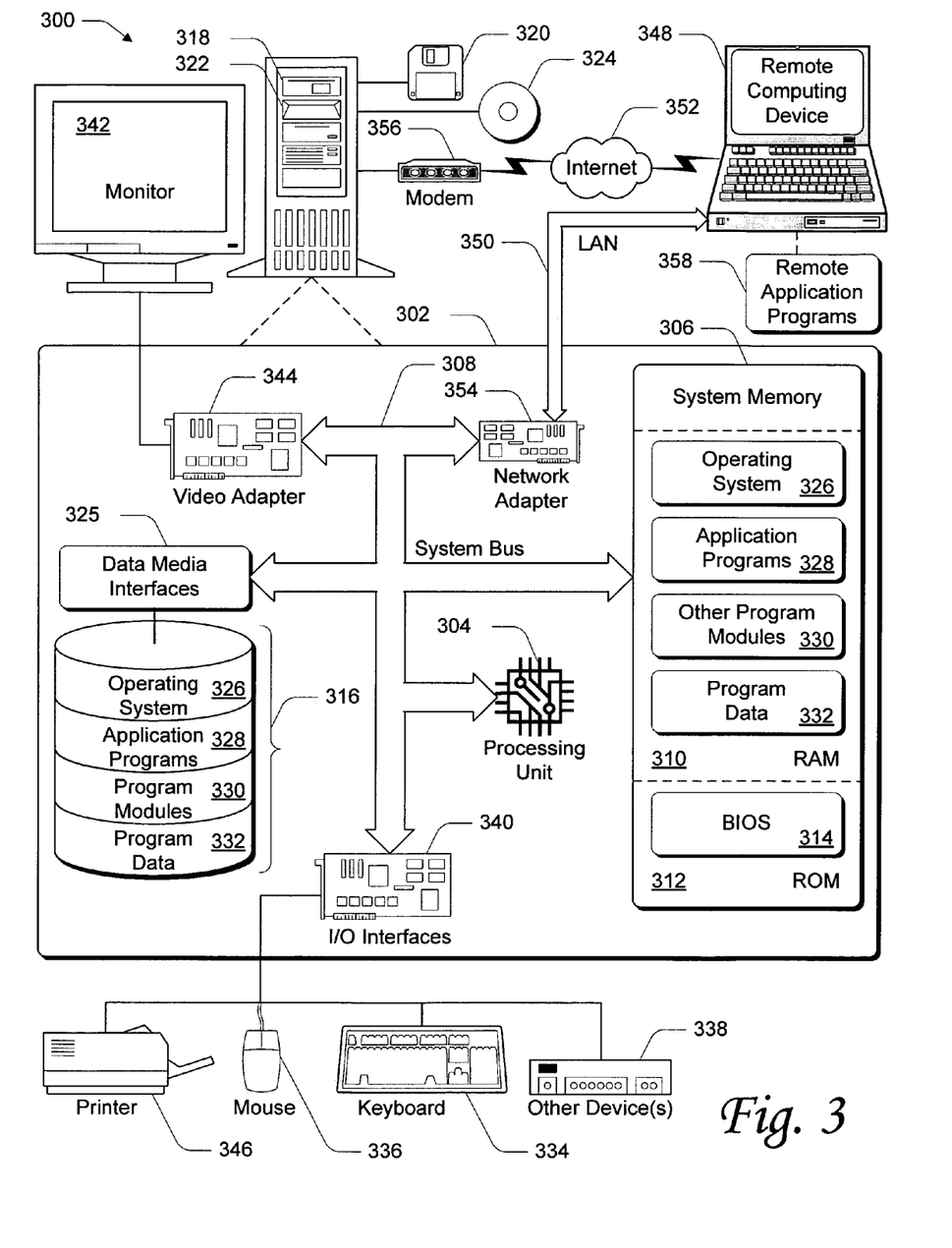
FIG. 3 is an example of a computing operating environment capable of (wholly or partially) implementing at least one embodiment described herein.

FIG. 3 illustrates an example of a suitable computing environment 300 within which an exemplary query-results categorizer, as described herein, may be implemented (either fully or partially). The computing environment 300 may be utilized in the computer and network architectures described herein.

The exemplary computing environment 300 is only one example of a computing environment and is not intended to suggest any limitation as to the scope of use or functionality of the computer and network architectures. Neither should the computing environment 300 be interpreted as having any dependency or requirement relating to any one or combination of components illustrated in the exemplary computing environment 300.

The exemplary query-results categorizer may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, personal digital assistants (PDA), appliances, special-purpose electronics (e.g., a DVD player), programmable consumer electronics, network PCs, minicomputers, mainframe computers, distributed computing environments that include any of the above systems or devices, and the like.

The exemplary query-results categorizer may be described in the general context of processor-executable instructions, such as program modules, being executed by a computer. Generally, program modules include routines, programs, objects, components, data structures, etc. that perform particular tasks or implement particular abstract data types. The exemplary query-results categorizer may also be practiced in distributed computing environments where tasks are performed by remote processing devices that are linked through a communications network. In a distributed computing environment, program modules may be located in both local and remote computer storage media including memory storage devices.

The computing environment 300 includes a general-purpose computing device in the form of a computer 302. The components of computer 302 may include, but are not limited to, one or more processors or processing units 304, a system memory 306, and a system bus 308 that couples various system components, including the processor 304, to the system memory 306.

The system bus 308 represents one or more of any of several types of bus structures, including a memory bus or memory controller, a peripheral bus, an accelerated graphics port, and a processor or local bus using any of a variety of bus architectures. By way of example, such architectures can include a CardBus, Personal Computer Memory Card International Association (PCMCIA), Accelerated Graphics Port (AGP), Small Computer System Interface (SCSI), Universal Serial Bus (USB), IEEE 1394, a Video Electronics Standards Association (VESA) local bus, and a Peripheral Component Interconnects (PCI) bus, also known as a Mezzanine bus.

Computer 302 typically includes a variety of processor-readable media. Such media may be any available media that is accessible by computer 302 and includes both volatile and non-volatile media, removable and non-removable media.

The system memory 306 includes processor-readable media in the form of volatile memory, such as random access memory (RAM) 310, and/or non-volatile memory, such as read only memory (ROM) 312. A basic input/output system (BIOS) 314, containing the basic routines that help to transfer information between elements within computer 302, such as during start-up, is stored in ROM 312. RAM 310 typically contains data and/or program modules that are immediately accessible to and/or presently operated on by the processing unit 304.

Computer 302 may also include other removable/non-removable, volatile/non-volatile computer storage media. By way of example, FIG. 3 illustrates a hard disk drive 316 for reading from and writing to a non-removable, non-volatile magnetic media (not shown), a magnetic disk drive 318 for reading from and writing to a removable, non-volatile magnetic disk 320 (e.g., a "floppy disk"), and an optical disk drive 322 for reading from and/or writing to a removable, non-volatile optical disk 324 such as a CD-ROM, DVD-ROM, or other optical media. The hard disk drive 316, magnetic disk drive 318, and optical disk drive 322 are each connected to the system bus 308 by one or more data media interfaces 325. Alternatively, the hard disk drive 316, magnetic disk drive 318, and optical disk drive 322 may be connected to the system bus 308 by one or more interfaces (not shown).

The disk drives and their associated processor-readable media provide non-volatile storage of computer readable instructions, data structures, program modules, and other data for computer 302. Although the example illustrates a hard disk 316, a removable magnetic disk 320, and a removable optical disk 324, it is to be appreciated that other types of processor-readable media, which may store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, may also be utilized to implement the exemplary computing system and environment.

Any number of program modules may be stored on the hard disk 316 magnetic disk 320, optical disk 324, ROM 312, and/or RAM 310, including, by way of example, an operating system 326, one or more application programs 328, other program modules 330, and program data 332.

A user may enter commands and information into computer 302 via input devices such as a keyboard 334 and a pointing device 336 (e.g., a "mouse"). Other input devices 338 (not shown specifically) may include a microphone, joystick, game pad, satellite dish, serial port, scanner, and/or the like. These and other input devices are connected to the processing unit 304 via input/output interfaces 340 that are coupled to the system bus 308, but may be connected by other interface and bus structures, such as a parallel port, game port, or a universal serial bus (USB).

A monitor 342 or other type of display device may also be connected to the system bus 308 via an interface, such as a video adapter 344. In addition to the monitor 342, other output peripheral devices may include components, such as speakers (not shown) and a printer 346, which may be connected to computer 302 via the input/output interfaces 340.

Computer 302 may operate in a networked environment using logical connections to one or more remote computers, such as a remote computing device 348. By way of example, the remote computing device 348 may be a personal computer, portable computer, a server, a router, a network computer, a peer device or other common network node, and the like. The remote computing device 348 is illustrated as a portable computer that may include many or all of the elements and features described herein, relative to computer 302.

Logical connections between computer 302 and the remote computer 348 are depicted as a local area network (LAN) 350 and a general wide area network (WAN) 352. Such networking environments are commonplace in offices, enterprise-wide computer networks, intranets, and the Internet. Such networking environments may be wired or wireless.

When implemented in a LAN networking environment, the computer 302 is connected to a local network 350 via a network interface or adapter 354. When implemented in a WAN networking environment, the computer 302 typically includes a modem 356 or other means for establishing communications over the wide network 352. The modem 356, which may be internal or external to computer 302, may be connected to the system bus 308 via the input/output interfaces 340 or other appropriate mechanisms. It is to be appreciated that the illustrated network connections are exemplary and that other means of establishing communication link(s) between the computers 302 and 348 may be employed.

In a networked environment, such as that illustrated with computing environment 300, program modules depicted relative to the computer 302, or portions thereof, may be stored in a remote memory storage device. By way of example, remote application programs 358 reside on a memory device of remote computer 348. For purposes of illustration, application programs and other executable program components, such as the operating system, are illustrated herein as discrete blocks, although it is recognized that such programs and components reside at various times in different storage components of the computing device 302, and are executed by the data processor(s) of the computer.

Processor-Executable Instructions

An implementation of an exemplary query-results categorizer may be described in the general context of processor-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 3 illustrates an example of a suitable operating environment 300 in which an exemplary query-results categorizer may be implemented. Specifically, the exemplary query-results categorizer(s) described herein may be implemented (wholly or in part) by any program modules 328-330 and/or operating system 326 in FIG. 3 or a portion thereof.

The operating environment is only an example of a suitable operating environment and is not intended to suggest any limitation as to the scope or use of functionality of the exemplary query-results categorizer(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipment, general and special-purpose appliances, application-specific integrated circuits (ASICs), network PCs, minicomputers, mainframe computers, distributed computing environments that include any of the above systems or devices, and the like.

Processor-Readable Media

An implementation of an exemplary query-results categorizer may be stored on or transmitted across some form of processor-readable media. Processor-readable media may be any available media that may be accessed by a computer. By way of example, processor-readable media may comprise, but is not limited to, "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

"Communication media" typically embodies processor-readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, communication media may comprise, but is not limited to, wired media such as a wired network or direct-wired connection, and wireless media such as acoustic, RF, infrared, and other wireless media. Combinations of any of the above are also included within the scope of processor-readable media.

CONCLUSION

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. One or more computer storage media having processor-executable instructions executed by a computer to perform a method generating a labeled hierarchical category structure comprising a multi-level category structure, the method comprising:

obtaining a resulting answer set of a query on a relational database, the answer set comprising multiple tuples and each tuple comprising information content;

generating the labeled hierarchical category structure based on the contents of the multiple tuples in the answer set;

defining an exploration cost as a function of a probability of a user exploring a particular category upon examining a label of the particular category, wherein the exploration cost is $\text{Cost}_{One}(C) = P_w(C)^* \text{frac}(C)^* |\text{tset}(C)| + (1-P_w(C))^* \Sigma (i=1 \text{ to } n)(\Pi(j=1 \text{ to } i\text{-}1)(1-P(C_j))^* P(C_i)^* (K^*i + \text{Cost}_{one}(C_i)));$ for each level of the hierarchical category structure, automatically determining a single categorizing attribute;

using the single categorizing attribute to partition the resulting answer set into multiple mutually disjoint categories, wherein once the single categorizing attribute has been used to partition the resulting answer set at any level in the multi-level category structure, the single categorizing attribute is not repeated at a later level; and displaying the labeled hierarchical category structure.

2. The one or more computer storage media as recited in claim 1, wherein the labeled hierarchical category structure for the answer set is automatically generated after obtaining the answer set.

3. The one or more computer storage media as recited in claim 1, wherein the tuples of the answer set are not tagged for inclusion in one or more pre-defined categories when the answer set is obtained.

4. The one or more computer storage media as recited in claim 1, wherein the generating comprises defining categories of the labeled hierarchical category structure based upon one or more attributes of the information content of a subset of tuples in the answer set.

5. The one or more computer storage media as recited in claim 1, wherein the generating comprises optimizing the labeled hierarchical category structure to reduce information overload.

6. The one or more computer storage media as recited in claim 1, wherein the generating comprises ranking nodes at one level, at least, of the labeled hierarchical category structure.

7. A query-results categorization system to generate a labeled hierarchical category structure comprising a multi-level category structure, the system comprising:

a processor;

a system memory coupled to the processor;

a query-results means stored in the system memory and configured to execute on the processor for obtaining a resulting answer set of a query on a relational database, the answer set comprising multiple tuples and each tuple comprising information content;

a generation means stored in the system memory and configured to execute on the processor for automatically generating the labeled hierarchical category structure based on the contents of the multiple tuples in the resulting answer set; a defining means for defining a cost of exploring the resulting answer set, wherein the cost of exploring is $$\text{Cost}_{One}(C) = P_w(C)^* frac(C)^* |tset(C)| + (1-P_w(C))^* \sum_{i=1}^{n} \left[ \prod_{j=1}^{i-1} (1-P(C_j))^* P(C_i)^* (K^*i + \text{Cost}_{one}(C_i)) \right];$$

a determining means stored in the system memory and configured to execute on the processor operable by the processor for automatically determining a single categorizing attribute for each level of the multi-level category structure; and a partitioning means stored in the system memory and configured to execute on the processor for partitioning the resulting answer set into multiple mutually disjoint categories by using the single categorizing attribute, wherein once the single categorizing attribute has been used to partition the resulting answer set at any level in the multi-level category structure, the single categorizing attribute is not repeated at a later level; and a displaying means stored in the system memory and configured to execute on the processor for displaying the labeled hierarchical category structure.

8. The system as recited in claim 7, wherein the generation means generates the labeled hierarchical category structure after the query-results means obtains the answer set.

9. The system as recited in claim 7, wherein the tuples of the answer set are not tagged for inclusion in one or more pre-defined categories when the answer set is obtained by the query-results means.

10. The system as recited in claim 7 farther comprising a defining means stored in the system memory and configured to execute on the processor for defining categories of the labeled hierarchical category structure based upon one or more attributes of the information content of a subset of tuples in the answer set.

11. The system as recited in claim 7 further comprising a ranking means stored in the system memory and configured to execute on the processor for ranking nodes at one level, at least, of the labeled hierarchical category structure.

12. A method of generating a labeled hierarchical category structure comprising a multi-level category structure, the method comprising:

obtaining a resulting answer set of a query on a relational database, the answer set comprising multiple tuples and each tuple comprising information content;

generating the labeled hierarchical category structure based on the contents of the multiple tuples in the answer set;

defining, using a computer processor, a cost of exploring the resulting answer set, wherein the cost of exploring is $$\text{Cost}_{One}(C) = P_w(C)^* frac(C)^* |tset(C)| + (1 - P_w(C))^* \Sigma(i = 1 \text{ to } n)$$
$$(\Pi(j = 1 \text{ to } i - 1)(1 - P(C_j))^* P(C_i)^* (K^*i + \text{Cost}_{one}(C_i)));$$

for each level of the multi-level category structure, automatically determining a single categorizing attribute;

using the single categorizing attribute to partition the resulting answer set into multiple mutually disjoint categories, wherein once the single categorizing attribute has been used to partition the resulting answer set at any level in the multi-level category structure, the single categorizing attribute is not repeated at a later level; and displaying the labeled hierarchical category structure.

13. The method as recited in claim 12, wherein the labeled hierarchical category structure for the answer set is automatically generated after obtaining the answer set.

14. The method as recited in claim 12, wherein the tuples of the answer set are not tagged for inclusion in one or more pre-defined categories when the answer set is obtained.

15. The method as recited in claim 12, wherein the generating comprises defining categories of the labeled hierarchical category structure based upon one or more attributes of the information content of a subset of tuples in the answer set.

16. The method as recited in claim 12, wherein the automatic generating comprises ranking nodes at one level, at least, of the labeled hierarchical category structure.

* * * * *